May 25, 1965 S. P. NOIK 3,184,965
APPARATUS FOR EXAMINING FLUID-FILLED BORE HOLES
Filed July 17, 1962 2 Sheets-Sheet 1

INVENTOR.
SIMON PHILIPPE NOIK
BY Brumbaugh, Free,
Graves & Donohue
his ATTORNEYS.

May 25, 1965 S. P. NOIK 3,184,965
APPARATUS FOR EXAMINING FLUID-FILLED BORE HOLES
Filed July 17, 1962 2 Sheets-Sheet 2

INVENTOR.
SIMON PHILIPPE NOIK
BY Brumbaugh, Free,
Graves & Donohue
his ATTORNEYS 3,184,965
APPARATUS FOR EXAMINING FLUID-FILLED
BORE HOLES
Simon Philippe Noik, Hericy-sur-Seine, France, assignor to Schlumberger Overseas S.A., Port of Spain, Trinidad, British West Indies, a corporation of Panama
Filed July 17, 1962, Ser. No. 211,949
Claims priority, application France, May 2, 1958, 764,676; Nov. 22, 1961, 880,064
10 Claims. (Cl. 73—152)

This application is a continuation-in-part of application Serial No. 807,416, filed April 20, 1959, now abandoned.

The present invention relates to improvements in apparatus for the examination of oil wells or boreholes, in particular with the view to controlling their production.

In order to ascertain and control the productivity of an oil well or the like, it is necessary to know the type of liquid filling the borehole at different levels thereof. Accordingly, it is the primary object of the present invention to provide improved apparatus for determining the nature of fluid filling a well at various depths.

Still another object of the invention is to provide improved apparatus for determining levels at which changes in the character of the fluid filling the well occur, such as of the phreatic layer, for example.

In accordance with the principles of the invention, these objects are attained by means of apparatus capable of making, at different levels inside the well, measurements of differences in local pressures, which differences depend in particular on the average specific weight of the fluid, or mixture of fluids, filling the well at the levels at which the measurements are made liable to flow.

The invention provides apparatus adapted to measure the difference between the pressures at two adjacent levels spaced apart a predetermined distance from each other in the direction of the longitudinal axis of the well, the differences in pressure providing, according to the specific manner in which they are measured as disclosed hereinafter, indications of the specific weight of the liquid filling the well.

Briefly, this apparatus for performing the examination in accordance with the invention, comprises generally an elongated casing at least partially hollow and including at spaced apart locations thereon diaphragms or the like exposed to the fluid filling the well. These diaphragms may be in the form of cylinders of resilient material, bellows, etc., sensitive to the fluid pressure to which they are exposed. An interior chamber in the casing is divided into a pair of portions, each completely filled with a known fluid and in fluid communication with respective ones of the diaphragms. The two portions of the chamber are separated by means of a bellows or other diaphragm device.

As the respective diaphragms are distended by changing pressures in the well bore fluid to which they are exposed, the movement thereof is transmitted through the fluid within the casing to respective sides of the separating bellows. The latter is then displaced in accordance with the differential pressure thereacross and the displacement may be used to actuate a suitable measuring instrument, such as mechanically variable potentiometer. The indications therefrom may be recorded in situ, or more preferably, transmitted to ground level for recording.

According to the invention, if it is desired to render the apparatus sensitive primarily to variation of the specific weight of the liquid in which it is immersed, the spaced diaphragms are not completely exposed to the well fluid but are separated therefrom by a perforated member which serves to prevent movement of fluid within the well from acting on the diaphragm. Thus, only the static pressures of the well bore fluid affect the diaphragm and the displacement thereof will be indicative of the fluid density only. The perforated member may be in th form of a screen-like member or, in another embodiment, a portion of the wall of the casing having elongated, narrow openings therein. In either case, the relatively small openings enable the member to function as a low-pass fluid filter.

The measurement of the specific weight of the liquid within the well bore gives clear indication of the nature of the fluid in which the apparatus is immersed, whether it be oil or water, and it will also show accurately whether gas is present at the various levels.

Further objects, features and advantages of the present invention will become more apparent from the following more detailed description thereof, when taken in conjunction with the accompany drawings, in which.

Figure 1:
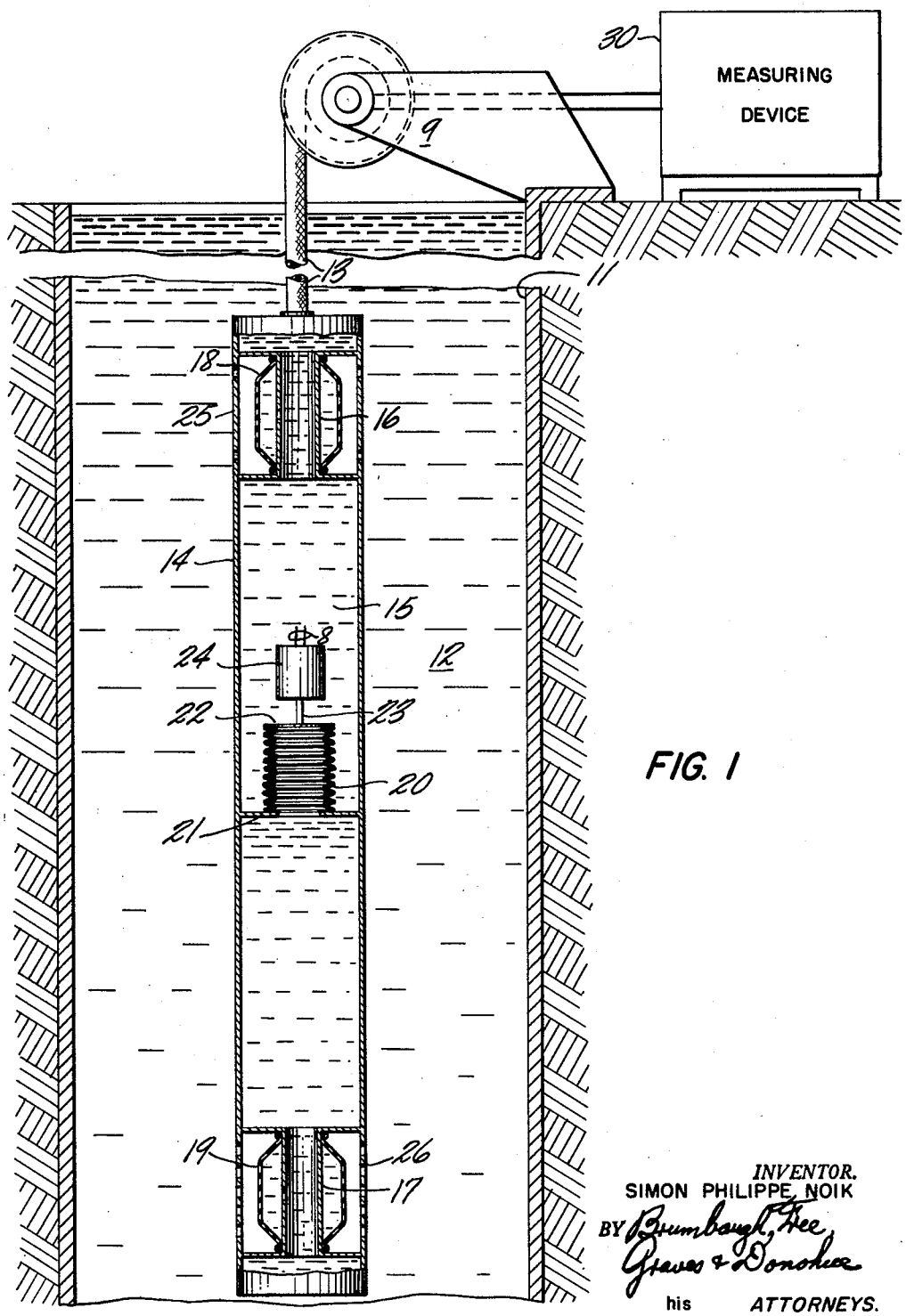
FIGURE 1 is a side elevation in longitudinal cross section of one embodiment of the invention, in operating position within an oil well.

In FIGURE 1, the numeral 11 designates a well bore filled with a liquid 12. The apparatus is positioned within the well bore under the control of a conventional cable 13, including electric leads adapted to transmit the data supplied by the apparatus to ground level. The cable 13 cooperates in a conventional manner with a suitable winch 9 located above ground level, which permits the lowering or raising of the apparatus so as to provide, if required, a continuous measurement.

The apparatus includes a tubular casing 14 filled with a suitable liquid 15 and opening at its upper and lower ends into perforating tubes of a reduced diameter, 16 and 17 respectively, around which are fitted diaphragms 18 and 19 respectively. The latter have the shape of a surface of revolution and are made of a yielding material such as synthetic rubber for example, the elasticity of which is negligible in practice.

The chamber inside the casing 14 is divided into two components by an elastic diaphragm 20, in the nature of a bellows, the periphery of which is secured at 21 to the inner surface of the casing 14. The upper surface 22 of the bellows is connected through a control member 23 with a suitable position measuring instrument 24 such as mechanically variable rheostat or potentiometer. The device 24 is connected electrically to a suitable measuring and recording device 30 at ground level in a conventional manner by means of leads 8 and the cable 13. Thus, information as to the position of the diaphragm 20 is transmitted to ground level as a result of the variations in the electrical resistance of the circuit caused by shifting of the control member 23.

In the embodiment of FIGURE 1, the diaphragms 18 and 19 are protected against the movements of the liquid 12 filling the well bore by perforated tubular screens or trellis-work cylinders 25 and 26 respectively. The screens 25 and 26 offer sufficient impediment to the flow of liquid in the borehole so that the dynamic pressure resulting from the flow along the apparatus is reduced to a negligible value at the diaphragms 18 and 19. At the same time, the holes in the screens permit the static pressure in the liquid to act on the diaphragms.

When such an apparatus is immersed inside the well, it will be readily apparent that the elastic deformation of the diaphragm 20 opposing the movement of the liquid inside the casing 14, varies chiefly with the difference between the static pressures appearing at the level of the higher and lower diaphragms 18 and 19, respectively. The difference in pressures is proportional to the weight of a column of the fluid of a height equal to the spacing between the diaphragms and thus is indicative of the specific weight thereof. Therefore, the measuring and recording device 30 at ground level will record the specific weights of the fluid filling the well correlated with the depth of measurement. From the indications of specific weight, the nature of the fluid filling the well at the different depths can be determined.

Figure 2:
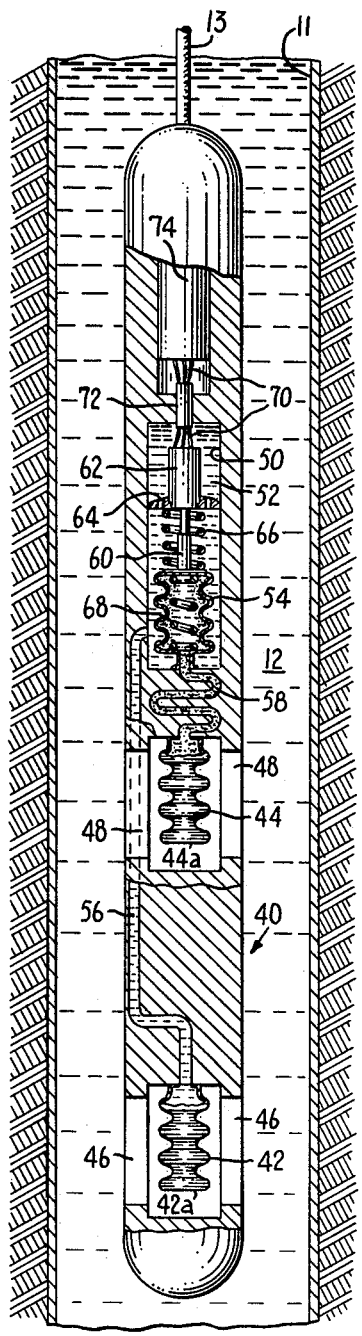
FIGURE 2 is a side elevation in longitudinal cross section of a second embodiment of the invention.

In the embodiment of FIGURE 2, the instrument 40 includes a pair of bellows 42, 44, located in spaced apart chambers therein, which chambers are open to the well fluid 12 by virtue of apertures 46 and 48, respectively.

The latter are preferably in the form of elongated narrow slits in the walls of the chambers which provide inlets of static pressure to the respective bellows.

An upper chamber 50 in the casing contains an additional bellows 54 having its lower end rigidly connected to the interior of the chamber. A conduit 56 connects the chamber 50 to the interior of the bellows 42. The interior of bellows 44 is connected to the interior of bellows 54 in the chamber 50 by means of a coiled conduit 58. The entire interior of the instrument, including chamber 50, conduits 56 and 58, and the interiors of bellows 42, 44 and 54 are completely filled with a fluid, such as kerosene, with the aid of a vacuum pump, so that no air remains therein.

The upper surface of the bellows 54 is coupled to a control element 60 of a variable rheostat or potentiometer element 62. The latter is fixed within the chamber 50 at its flange, which is provided with a series of holes 64 to permit free fluid flow therein. A coil spring 66 surrounds the control member 60 between the upper surface of bellows 54 and the lower surface of the rheostat, and is opposed by another coil spring 68 longitudinally disposed within the bellows 54.

The electrical conductors from the rheostat 62 pass through a fluid tight bushing 72 to electronic apparatus 74, which may include amplifiers and indicating circuits, if such circuits are preferred within the instrument itself. Alternatively, the conductors 70 may connect directly with cable 13 to conduct the signals to the surface.

With the instrument 40 suspended within the borehole, the static pressure in the borehole fluid is transmitted to the respective bellows 42, 44, moving their respective end faces 42A, 44A, according to the magnitude thereof. The movements are transmitted through fluid in the conduits 56 and 58 to the chamber 50 wherein they act on the outer and inner surfaces of the bellows 54 respectively. The upper surface of the bellows 54 therefore moves in proportion to the pressure difference sensed at the bellows 42 and 44, as modified by the action of the opposing springs 66, 68. The latter serve to remove the effects of non-linearity of the operation of bellows 54.

At the upper surface of the bellows 54 moves in accordance with the pressure differential, the connecting arm 60 also moves, varying the action of the rheostat 62. The resultant electrical signals, which are proportional to the motion of the arm 60, are transmitted to the surface instruments.

The bellows 42, 44, are preferably made of a metal, so as to be more resistant to the deteriorating effects of the fluids encountered in the borehole. By mounting the two bellows with the same orientation, that is, with their end faces 42A, 44A, facing either down as illustrated, or upwardly, any effect of thermal expansion of the fluid filling the interior of the instrument is cancelled out. Since the end faces of both bellows will move the same amount as the kerosene expands or contracts in response to changes in temperature, the spacing therebetween will remain the same and thus the specific weight measurement will not be affected.

The particular structure of the embodiment of FIGURE 2 also serves to reduce erroneous indications that may be produced by sudden jarring or rapid movements of the device. Any tendency of the kerosene within the instrument to be shifted as a result of a bumping or jarring of the instrument is overcome by the low pass filter action provided by conduits 56 and 58. Both are made of fairly small diameter so as to impede the flow of fluid therethrough. The conduit 58 is coiled as indicated to provide the extra length necessary for the filter action. Alternatively, conduit 58 may be made still smaller in diameter and the coiling thereof eliminated. Since no sudden shifting of the fluid within the chamber 50 can be produced, no spurious actuation of the rheostat 62 will occur.

Various modifications of the device of FIGURE 2 will be readily apparent. For example, the bellows 42 and 44 may be located on either side of the chamber 50, in which case the overall length of the instrument may be reduced. In addition, the measurement bellows 54 may be replaced with any differential pressure sensing arrangement, such as a bourdon tube, and the device 62 may be any type of transducer capable of transforming a linear mechanical motion into an electrical signal, e.g., a differential linear transformer, a variable capacitor, digital encoder, etc.

Therefore the disclosed embodiments, in accordance with the invention, provide for obtaining detailed indications as to the nature of the fluid contained within the well, since the lower level of the oil producing area may be detected by sudden changes in specific weight. In the gas producing areas, for example, the viscosity of the gas is lower than that of the liquid in the adjacent levels.

Obviously, the arrangements described are merely exemplary and are susceptable of modification and variation without departing from the scope of the invention, therefore, the invention is not deemed to be limited except as set forth in the appended claims.

I claim:

1. Apparatus for examining fluid-filled boreholes and the like comprising an elongated casing closed at both ends and adapted to be immersed vertically in the borehole at adjustable levels, a pair of yielding diaphragms carried by said casing at vertically spaced points thereon and subjected to the pressure of the fluid in the borehole upon immersion of the casing, perforated means extending outside of each of said diaphragms to provide inlets for the transmission of static pressure of the borehole fluid onto the corresponding diaphragm sensitive means carried by the casing and responsive to the difference between the pressures transmitted to said diaphragms to provide an output manifestation thereof, and measuring means controlled by said sensitive means to indicate the extent of said manifestation.

2. Apparatus for examining fluid-filled boreholes and the like, comprising an elongated casing closed at both ends and adapted to be immersed vertically in the borehole at adjustable levels, a pair of bellows each fixed at one end thereof to the casing at vertically spaced points thereon and subjected to the pressure of the fluid in the borehole upon immersion of the casing, the other end of each of said bellows being free and similarly oriented with respect to the casing, perforated means having relatively small openings therein forming a portion of the exterior wall of said casing surrounding each of said bellows to provide inlets for the transmission of static pressure of the borehole fluid onto the corresponding bellows, sensitive means carried inside the casing and responsive to the difference between the pressures transmitted to said bellows to provide an output manifestation thereof, and measuring means controlled by said sensitive means to indicate the extent of said manifestation.

3. Apparatus according to claim 2 wherein said casing includes a chamber filled with a liquid and said sensitive means comprises a diaphragm element dividing said chamber into two portions, means establishing fluid communication paths between the interiors of said bellows and said respective portions of said chamber, whereby said diaphragm is sensitive to the difference in pressures transmitted by said bellows.

4. Apparatus according to claim 3 wherein said respective fluid communication paths are of relatively small cross-sectional area to prevent sudden movement of liquid therethrough, whereby said diaphragm does not respond to abrupt motion of said casing.

5. Apparatus according to claim 3 wherein said diaphragm comprises an additional bellows.

6. Apparatus for examining fluid-filled boreholes and the like comprising an elongated casing closed at both ends and adapted to be immersed vertically in the borehole at adjustable levels, a pair of chambers carried inside the casing at vertically spaced points thereon, inlets of static pressure for the fluids flowing along the apparatus provided in the wall of said chambers, a yielding diaphragm set in each chamber and subjected to the said static pressures of the fluids, another chamber within said casing filled with a liquid, differential pressure sensing means dividing said other chamber into two portions, means providing a fluid communication path between the interior surface of each of said diaphragms and respective portions of said other chamber, and measuring means controlled by said differential pressure sensing means.

7. Apparatus according to claim 6, wherein said differential pressure sensing means comprises a bellows, opposing springs associated with said bellows, the inner surface of said bellows forming a wall of one of said portions of said chamber and the outer surface forming a wall of the other of said chamber portions.

8. Apparatus according to claim 6, wherein the measuring means controlled by the differential pressure sensing means comprises a transducer for transforming a linear mechanical motion into an electrical signal.

9. Apparatus according to claim 6, wherein each of said yielding diaphragms comprises a bellows, one end of which is fixed and the other end free with respect to the casing, the free ends of said bellows being similarly oriented with respect to the casing.

10. Apparatus according to claim 6, wherein said means for providing fluid communication paths between the interior surfaces of said diaphragms and the respective portions of said other chamber comprises conduits of relatively small diameter to provide low pass filter action for pressure variations transmitted by the liquid in said conduits.

References Cited by the Examiner
UNITED STATES PATENTS

| | | | |
|---|---|---|---|
| 1,981,354 | 11/34 | Goerg | 73—299 |
| 2,057,767 | 10/36 | Collins | 73—205 |
| 2,277,898 | 3/42 | Andrew | 73—155 X |
| 2,334,920 | 11/43 | Gosline et al. | 73—155 |
| 2,354,847 | 8/44 | Woodbridge | 73—299 X |
| 2,451,605 | 10/48 | Barnes | 73—438 |
| 2,662,404 | 12/53 | Sontheimer | 73—438 X |

RICHARD C. QUEISSER, *Primary Examiner.*

ROBERT L. EVANS, *Examiner.*